United States Patent
Takemoto

(10) Patent No.: US 10,343,462 B2
(45) Date of Patent: Jul. 9, 2019

(54) PNEUMATIC TIRE

(71) Applicant: SUMITOMO RUBBER INDUSTRIES, LTD., Kobe-shi, Hyogo (JP)

(72) Inventor: Yoshiaki Takemoto, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 560 days.

(21) Appl. No.: 14/933,701

(22) Filed: Nov. 5, 2015

(65) Prior Publication Data
US 2016/0152090 A1 Jun. 2, 2016

(30) Foreign Application Priority Data
Nov. 27, 2014 (JP) ................. 2014-240398

(51) Int. Cl.
*B60C 11/04* (2006.01)
*B60C 11/12* (2006.01)
(Continued)

(52) U.S. Cl.
CPC ...... *B60C 11/0327* (2013.01); *B60C 11/0306* (2013.01); *B60C 11/125* (2013.01); *B60C 11/1236* (2013.01); *B60C 11/1272* (2013.01); *B60C 11/1281* (2013.01); *B60C 11/1376* (2013.01); *B60C 2011/036* (2013.01); *B60C 2011/0334* (2013.01); *B60C 2011/0344* (2013.01); *B60C 2011/0365* (2013.01);
(Continued)

(58) Field of Classification Search
CPC .................. B60C 11/1281; B60C 11/125
See application file for complete search history.

(56) References Cited

U.S. PATENT DOCUMENTS

| D721,030 S | * | 1/2015 | Kato | ............................ D12/517 |
| 2005/0000613 A1 | * | 1/2005 | Maruoka | ................. B60C 11/00 |
| | | | | 152/209.1 |

(Continued)

FOREIGN PATENT DOCUMENTS

| EP | 213452 A2 * | 3/1987 |
| EP | 2 732 982 A1 | 5/2014 |

(Continued)

OTHER PUBLICATIONS

Machine translation for Japan 06-080002 (Year: 2018).*

(Continued)

*Primary Examiner* — Steven D Maki
(74) *Attorney, Agent, or Firm* — Birch, Stewart, Kolasch & Birch LLP

(57) ABSTRACT

A pneumatic tire comprises a tread portion 2 provided with two shoulder main grooves 3, a crown main grooves 4, two shoulder land zones 8, and two middle land zones 7. The shoulder land zones 8 are each provided with shoulder lateral grooves 11. The middle land zones 7 are each provided with middle narrow grooves 10. Each of the middle narrow grooves 10 comprises a sipe-like narrow portion 12 whose groove width is less than 2 mm, and a wide portion 14 whose groove width is not less than 2 mm. The wide portion 14 includes an axially outer wide portion 15 formed at the axially outer end of the middle narrow groove 10.

14 Claims, 11 Drawing Sheets

(51) Int. Cl.
*B60C 11/03* (2006.01)
*B60C 11/13* (2006.01)

(52) U.S. Cl.
CPC .............. *B60C 2011/0381* (2013.01); *B60C 2011/0395* (2013.01)

(56) References Cited

U.S. PATENT DOCUMENTS

| | | | | |
|---|---|---|---|---|
| 2005/0211355 | A1* | 9/2005 | Metz | B60C 11/0309 152/209.24 |
| 2012/0222788 | A1* | 9/2012 | Nishiwaki | B60C 11/0306 152/209.18 |
| 2013/0292021 | A1* | 11/2013 | Tanaka | B60C 11/0306 152/209.22 |
| 2015/0210121 | A1* | 7/2015 | Sanae | B60C 11/0304 152/209.8 |

FOREIGN PATENT DOCUMENTS

| | | | |
|---|---|---|---|
| EP | 2 899 041 A1 | | 7/2015 |
| JP | 06-080002 A | * | 3/1994 |
| JP | 2013-78984 A | | 5/2013 |

OTHER PUBLICATIONS

Machine translation for Europe 213452 (Year: 2018).*
Extended European Search Report, dated Apr. 1, 2016, for corresponding European Application No. 15192508.8.

* cited by examiner

US 10,343,462 B2

PNEUMATIC TIRE

TECHNICAL FIELD

The present invention relates to a pneumatic tire, more particularly to a tread pattern capable of improving wet performance and steering stability on dry roads well balancedly.

BACKGROUND ART

In the following patent document 1, for example, there is disclosed a pneumatic tire whose tread portion is provided in middle land zones with narrow grooves.

Such narrow grooves may serve a function in discharging water in part, while maintaining the rigidity of the middle land zones. In the middle narrow groove of the patent document 1, however, a small groove width of less than 2 mm continues along the length of the groove. Therefore, in the ground contacting patch of the tire, the opposite walls of the narrow groove tend to contact with each other in their substantially whole area. Accordingly, the narrow grooves can not serve for drainage, and aquaplaning phenomenon is liable to occur when running on wet roads at high speed. Thus, in order to satisfy both of wet performance and steering stability on dry roads, the pneumatic tire of the patent document 1 has room for improvement.

PRIOR ART DOCUMENT

Patent document 1: Japanese Patent Application Publication No. 2013-78984

SUMMARY OF THE INVENTION

Problems to be Resolved by the Invention

It is therefore, an object of the present invention to provide a pneumatic tire in which the wet performance and steering stability on dry roads are improved well balancedly.

Means of Solving the Problems

According to the present invention, a pneumatic tire comprises
a tread portion provided with circumferentially continuously extending main grooves including a pair of axially outermost shoulder main grooves and a crown main groove therebetween so that the tread portion is axially divided into land zones including a pair of shoulder land zones axially outside the respective shoulder main grooves, and a pair of middle land zones therebetween,
wherein
each of the shoulder land zones is provided with shoulder lateral grooves extending axially inwardly from the tread edge and terminating within the shoulder land zone,
each of the middle land zones is provided with middle narrow grooves each having an axially outer end connected to the shoulder main groove, and each comprising a sipe-like narrow portion and a wide portion,
wherein
at the ground contacting surface of the middle land zone, the sipe-like narrow portion has a width of less than 2 mm, and the wide portion has a width of not less than 2 mm, and
the wide portion includes an axially outer wide portion formed at the axially outer end of the middle narrow groove.

It is preferable that the sipe-like narrow portion extends radially inwardly to the groove bottom with a constant groove width, and
the wide portion comprises
a tapered part in which the groove width is gradually decreased toward the radially inside of the tire, and
a radially inner part continued from the tapered part and extending radially inwardly with the same groove width as the sipe-like narrow portion.

It is preferable that each of the middle narrow grooves has an axially inner end connected to the crown main groove, and
the wide portion includes an axially inner wide portion formed at the axially inner end of the middle narrow groove.

It is preferable that the sipe-like narrow portion is formed between the axially outer wide portion and the axially inner wide portion.

It is preferable that the sipe-like narrow portion extends obliquely with respect to the tire axial direction.

The wide portion may be inclined with respect to the tire axial direction at a different angle than the sipe-like narrow portion.

The wide portion may extend substantially parallel with the tire axial direction.

It is preferable that the wide portion is inclined with respect to the tire axial direction.

It is preferable that the wide portion is inclined with respect to the tire axial direction to the opposite direction to the inclining direction of the sipe-like narrow portion with respect to the tire axial direction.

It is preferable that the axially outer wide portion extends substantially parallel with the tire axial direction,
the axially inner wide portion extends substantially parallel with the tire axial direction,
the sipe-like narrow portion extends between the axially outer wide portion and the axially inner wide portion obliquely with respect to the tire axial direction, and
the axially outer wide portions are shifted in the tire circumferential direction from the axially inner wide portions.

It is preferable that each of the middle narrow grooves has a first groove-wall on one side in the tire circumferential direction and a second groove-wall on the other side in the tire circumferential direction, and
the axially outer and inner wide portions of the middle narrow groove are each provided in the first groove-wall with a gentle slope part inclined with respect to the tire radial direction largely more than the second groove-wall.

Therefore, according to the present invention, the rigidity in an axially inside part of each shoulder land zone is increased since the shoulder lateral grooves are not connected to the shoulder main groove, and good steering stability on dry roads can be obtained.

Further, the middle land zones are prevented from being decreased in the rigidity since the middle narrow grooves comprise the sipe-like narrow portions.

Furthermore, since the middle narrow grooves comprise the wide portions, even if the opposite groove-walls in the sipe-like narrow portion contact with each other during running, the opposite groove-walls in the wide portion do not contact with each other and the middle narrow grooves can secure spaces available for drainage. Thus, it is possible to prevent aquaplaning phenomenon.

Since the axially outer wide portions of the middle narrow grooves are opened to the shoulder main grooves, a water film between the middle land zones and the road surface is led to the shoulder main grooves, and the wet performance and the resistance to aquaplaning can be improved.

Thus, the pneumatic tire according to the present invention can be improved in the wet performance and steering stability on dry roads well balancedly.

BRIEF DESCRIPTION OF THE DRAWINGS

FIG. 5($b$) is a cross sectional view of the wide portion taken long line C-C in FIG. 4.

DESCRIPTION OF THE PREFERRED EMBODIMENTS

The present invention is suitably applied to a pneumatic tire for passenger car. Taking a passenger car tire as example, embodiments of the present invention will now be described in detail in conjunction with the accompanying drawings.

A pneumatic tire comprises a tread portion 2 whose outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing cord layer disposed radially outside the carcass in the tread portion as well known in the art.

Figure 1:
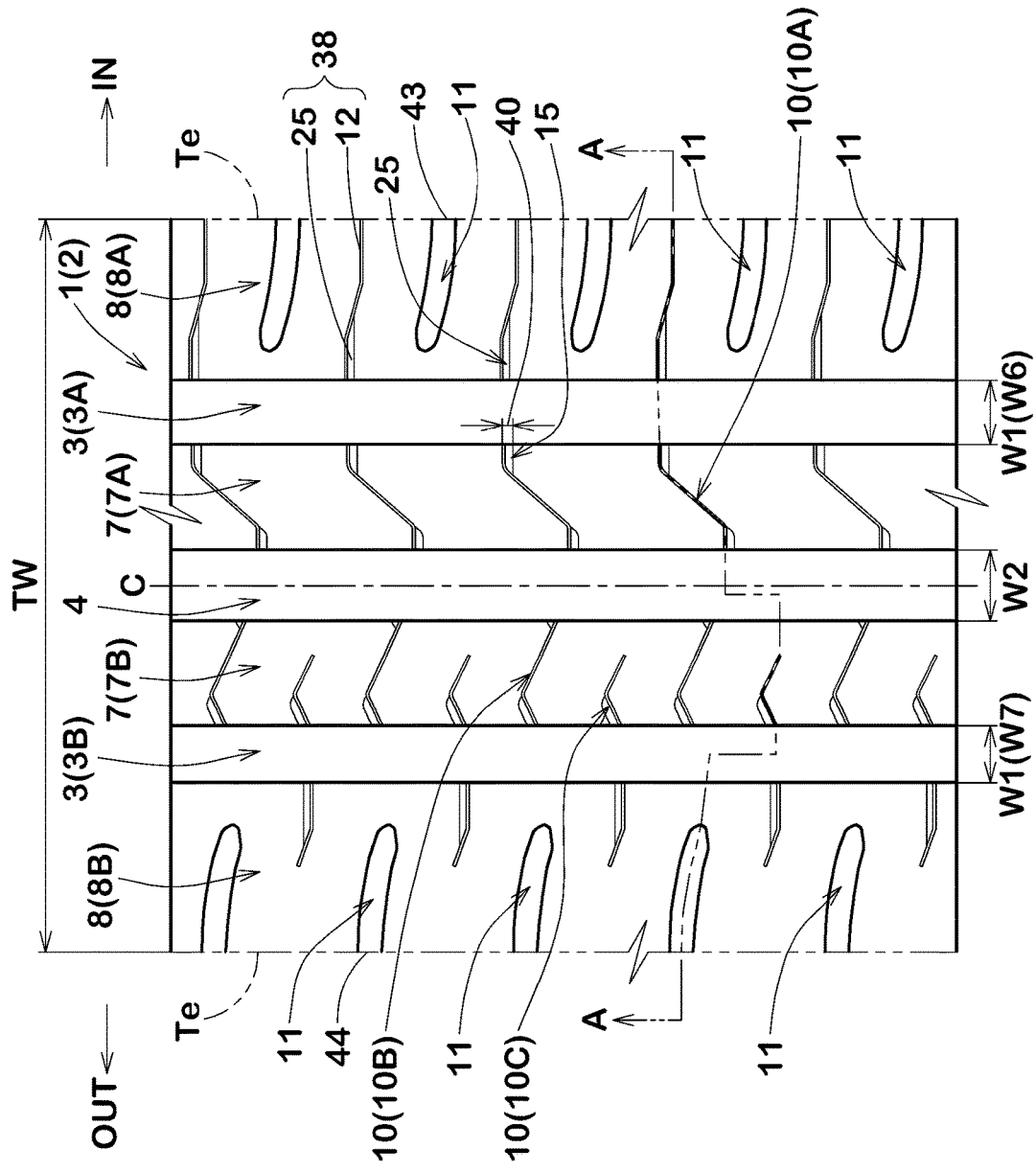
FIG. 1 is a developed partial view of a tread portion of a pneumatic tire as an embodiment of the present invention.
Figure 2:
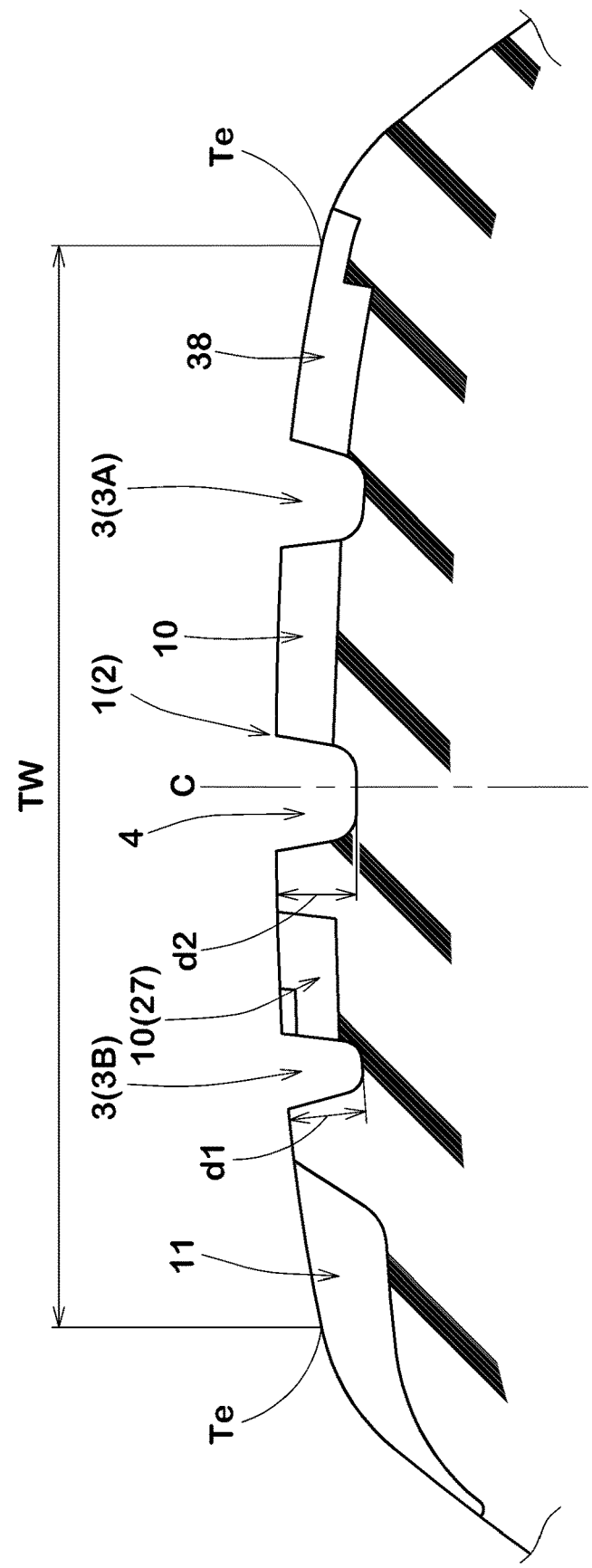
FIG. 2 is a cross sectional view of the tread portion taken along line A-A in FIG. 1.

In this embodiment, as shown in FIG. 1, the tread portion 2 is provided with a tread pattern of left-right asymmetry (asymmetry about the tire equator). But, in this embodiment, the tire is nondirectional (or bidirectional). The mounting position of the tire is specified. For example, the sidewall portion to be located on outside is provided with an indication such as "outside", and the sidewall portion to be located on inside is provided with an indication such as "inside".

Accordingly, the tread portion 2 has an outboard tread edge Te to be positioned away from the center of the vehicle body and an inboard tread edge Te to be positioned close to the center of the vehicle body.

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

In the embodiment shown in FIG. 1, the pneumatic tire 1 is provided in the tread portion 2 with circumferentially continuously extending main grooves: a pair of shoulder main grooves 3 and at least one crown main groove 4 therebetween.

In this embodiment, the shoulder main grooves 3 and the crown main groove 4 are straight grooves. But, one or more of, or all of the main grooves 3 and 4 may be a zigzag or wavy groove.

The shoulder main grooves 3 are an inboard shoulder main groove 3A and an outboard shoulder main groove 3B.

In this embodiment, at least one crown main groove 4 is only one crown main groove 4 disposed on the tire equator C. But, at least one crown main groove 4 may be, for example, a pair of the crown main grooves 4 disposed one on each side of the tire equator C.

For example, the groove width w1 of each shoulder main groove 3 and the groove width w2 of each crown main groove 4 are set in a range of from 3.5% to 10.0% of the tread width TW. Preferably, the groove width w1 of the shoulder main groove 3 is constant in the tire circumferential direction, and the groove width w2 of the crown main groove 4 is constant in the tire circumferential direction.

The groove width w6 of the inboard shoulder main groove 3A is more than the groove width w7 of the outboard shoulder main groove 3B. The ratio w7/w6 is preferably set in a range of not less than 0.75, more preferably not less than 0.80, but, not more than 0.95, more preferably not more than 0.90. Thereby, the steering stability on dry roads and the wet performance can be improved well balancedly. In addition, pumping sound from the outboard shoulder main groove 3B becomes small, and the noise performance can be improved.

The crown main groove 4 has a groove width which is more than the width of the inboard shoulder main groove 3A and more than the width of the outboard shoulder main groove 3B. Thereby, the drainage in the vicinity of the tire equator C can be expedited, and aquaplaning phenomenon can be effectively prevented.

In the case of a passenger car tire, the depth d1 of the shoulder main groove 3 and the depth d2 of the crown main groove 4 are preferably set in a range of from 5.0 to 12.0 mm.

By the main grooves 3 and 4, as shown in FIG. 1, the tread portion 2 is divided into two middle land zones 7 each defined between the shoulder main groove 3 and the crown main groove 4, and two shoulder land zones 8 defined axially outside the respective shoulder main grooves 3.

The middle land zones 7 are an inboard middle land zone 7A and an outboard middle land zone 7B.

The shoulder land zones 8 are an inboard shoulder land zone 8A and an outboard shoulder land zone 8B.

Figure 3:
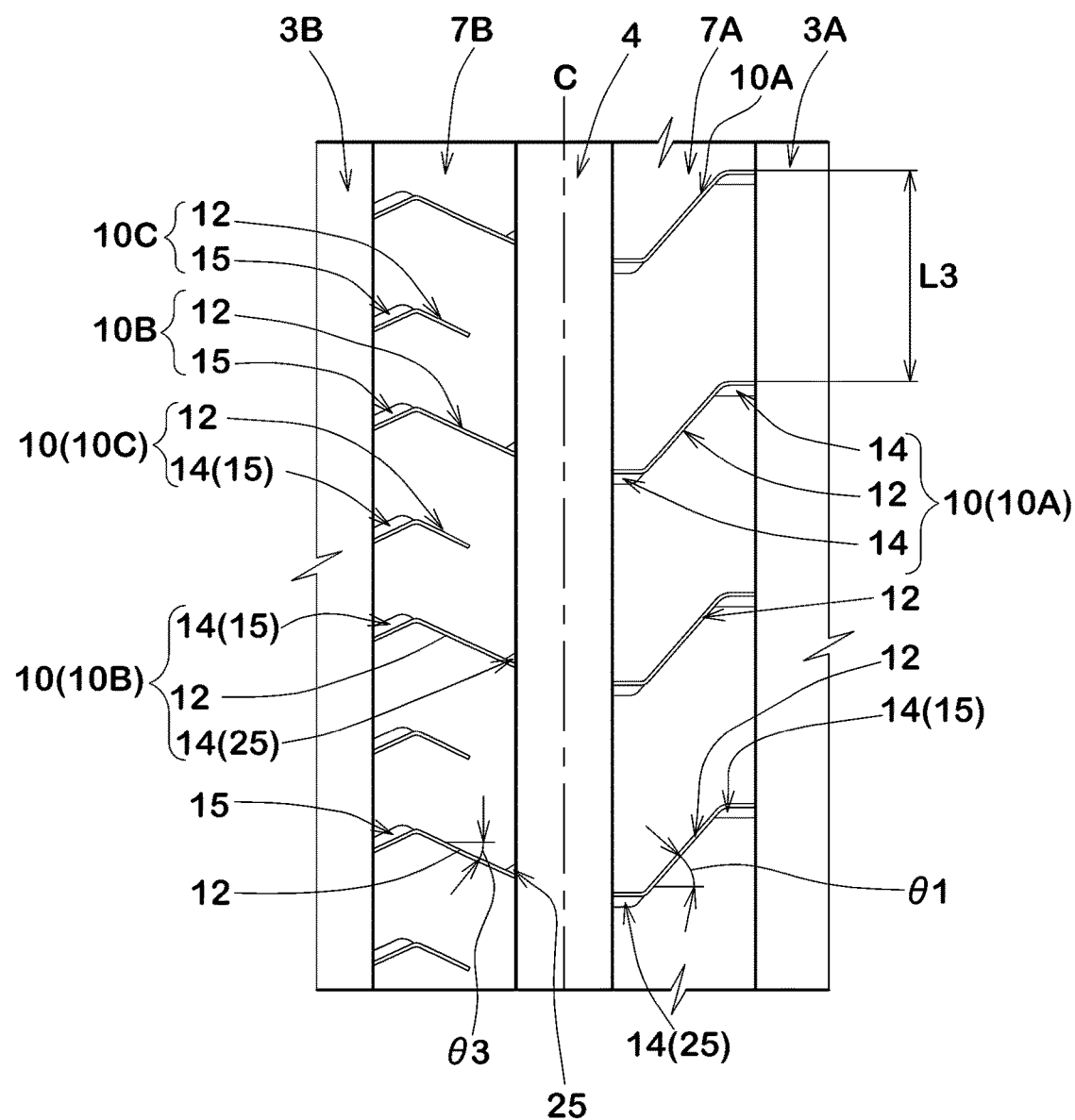
FIG. 3 is a developed partial view of the tread portion showing its inboard and outboard middle land zones.

As shown in FIG. 3, each of the inboard middle land zone 7A and the outboard middle land zone 7B is provided with middle narrow grooves 10. But, there is no lateral groove having a groove width of more than that of the middle narrow grooves 10 and extending across the entire width of the concerned land zone 7A, 7B. Therefore, each middle land zone 7A, 7B can be considered as a rib extending circumferentially of the tire.

The middle narrow grooves 10 are first middle narrow grooves 10A, second middle narrow grooves 10B, and third middle narrow grooves 10C.

The first middle narrow grooves 10A are disposed in the inboard middle land zone 7A. Each of the first middle narrow grooves 10A has an axially outer end connected to the inboard shoulder main groove 3A, and an axially inner end connected to the crown main groove 4.

Figure 4:
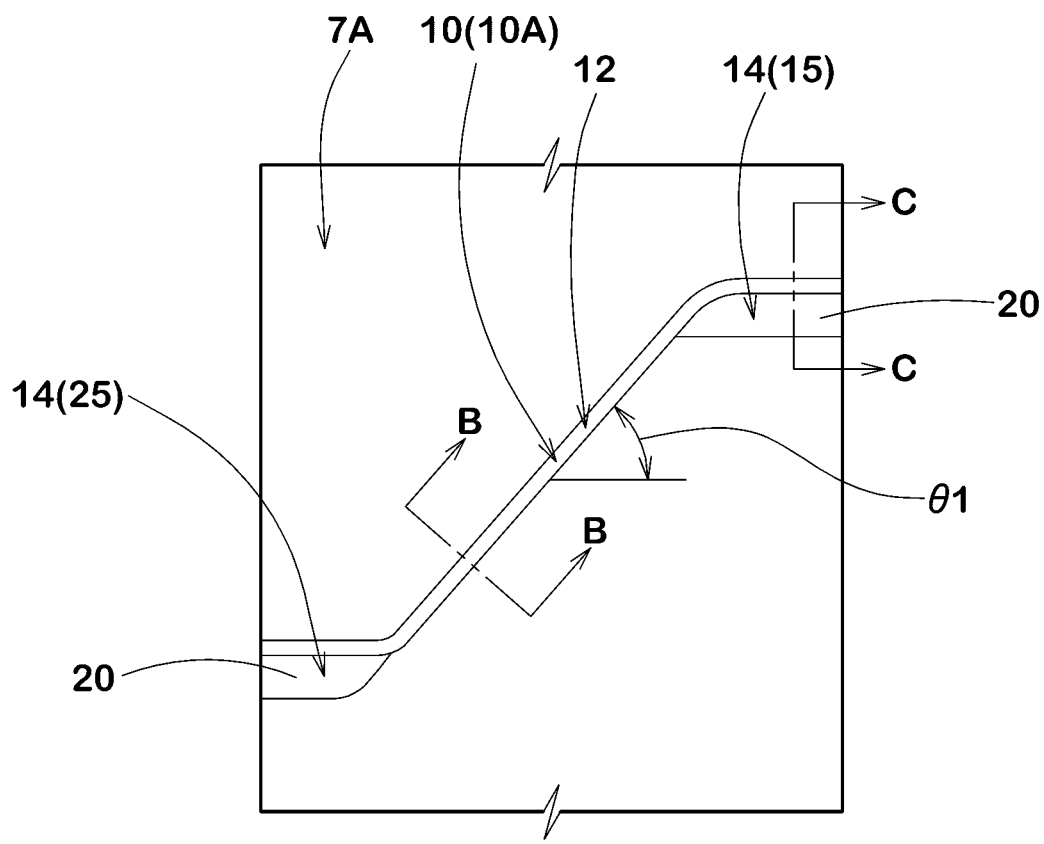
FIG. 4 is an enlarged top view of one of the first middle narrow grooves shown in FIG. 3.

As shown in FIG. 4, each of the first middle narrow grooves 10A comprises a sipe-like narrow portion 12 whose groove width is less than 2 mm at the ground contacting surface of the land zone, and a wide portion 14 whose groove width is not less than 2 mm at the ground contacting surface of the land zone.

Such first middle narrow grooves 10A prevent the rigidity of the inboard middle land zone 7A from being decreased because of the sipe-like narrow portion 12 having a groove width less than the conventional lateral groove.

Further, even if the opposite groove-walls of the sipe-like narrow portion 12 contact with each other during running, the opposite groove-walls of the wide portion 14 do not contact with each other, and a space available for drainage can be secured. Therefore, aquaplaning phenomenon can be effectively prevented.

The sipe-like narrow portion 12 in this example extends straight, and is inclined with respect to the tire axial direction. Such sipe-like narrow portion 12 exerts edge effect in the tire circumferential direction and tire axial direction. In order to effectively derive the above-mentioned advantageous effects, the angle θ1 of the sipe-like narrow portion 12 with respect to the tire axial direction is preferably set in a range of not less than 40 degrees, more preferably not less than 45 degrees, but, not more than 55 degrees, more preferably not more than 50 degrees.

Figure 5A:
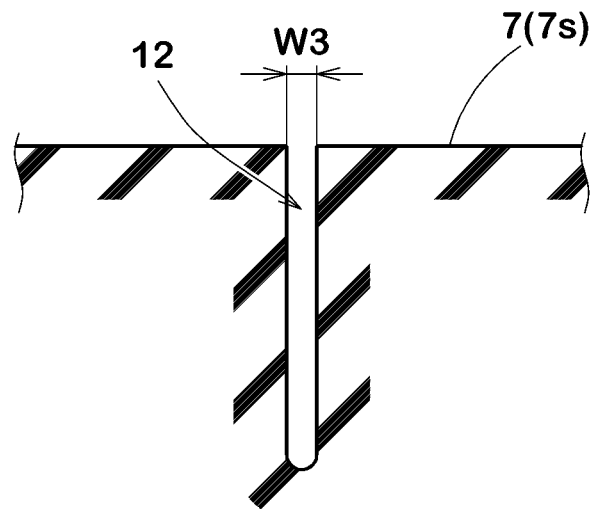
FIG. 5($a$) is a cross sectional view of the sipe-like narrow portion taken along line B-B in FIG. 4.

As shown in FIG. 5(a), the sipe-like narrow portion 12 extends radially inwardly from the ground contacting surface 7s of the middle land zone 7 to its bottom which is rounded in this example, while keeping a constant groove width.

The groove width w3 of the sipe-like narrow portion 12 is preferably set in a range of not more than 1.8 mm, more preferably not more than 1.5 mm, but not less than 0.3 mm, more preferably not less than 0.5 mm in order to improve the steering stability on dry roads and the wet performance well balancedly.

Figure 5B:
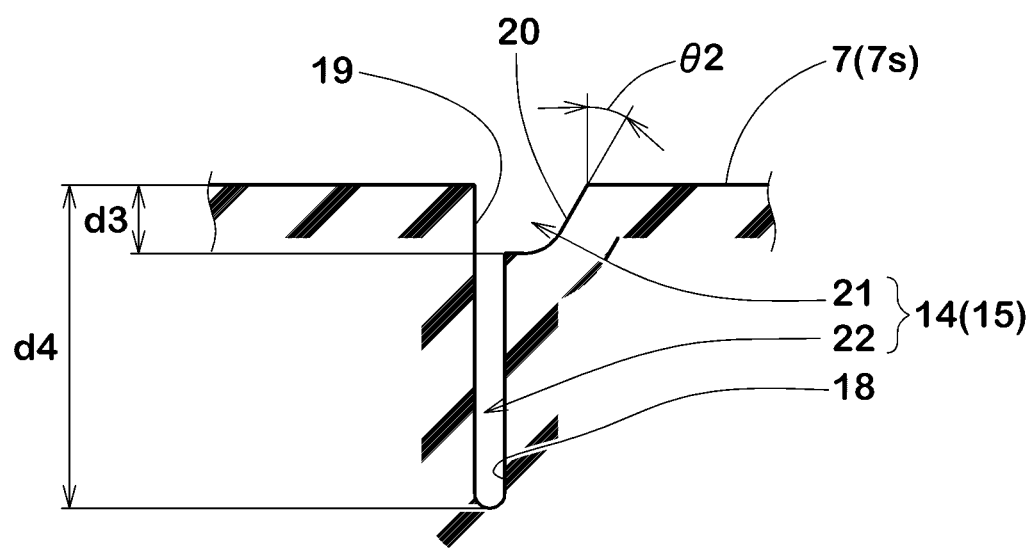

The wide portion 14 has opposite groove-walls which are a first groove-wall 18 on one side in the tire circumferential direction, and a second groove-wall 19 on the other side in the tire circumferential direction, wherein, as shown in FIG. 5(b), in the cross section perpendicular to the longitudinal direction of the groove, the first groove-wall 18 partly extends substantially parallel with the tire radial direction, and partly inclines with respect to the tire radial direction to have a gentle slope part 20, whereas the second groove-wall 19 all extends substantially parallel with the tire radial direction. Thereby, the wide portion 14 comprises a radially outermost tapered part 21 in which the groove width gradually decreases toward the radially inside of the tire, and a radially inner part 22 extending from the tapered part 21 toward the radially inside of the tire while keeping a groove width equal to the groove width of the sipe-like narrow portion 12.

The angle θ2 of the gentle slope part 20 with respect to the tire radial direction is preferably set in a range of not less than 20 degrees, more preferably not less than 25 degrees, but, not more than 40 degrees, more preferably not more than 45 degrees. Such gentle slope part 20 exerts good drainage, while preventing uneven wear around the tapered part 21.

In this example, the gentle slope part 20 is continued to the groove-wall of the radially inner part 22 through a smoothly curved surface. However, the gentle slope part 20 is not limited to such configuration. It may be possible that the gentle slope part 20 is a flat surface extending from the ground contacting surface 7s of the middle land zone 7 to the radially inner part 22.

The gentle slope part 20 may be formed on each of the groove-walls of the wide portion 14. Thereby, the opening width in the tapered part 21 is increased, and the wet performance is improved.

The depth d3 of the tapered part 21 is preferably set in a range of not less than 0.15 times, more preferably not less than 0.20 times, but not more than 0.35 times, more preferably not more than 0.30 times the depth d4 of the wide portion 14. Such tapered part 21 improves the steering stability on dry roads and the wet performance well balancedly.

As shown in FIG. 4 showing the top view of the first middle narrow groove 10A, the wide portion 14 includes an axially outer wide portion 15 formed axially outside the sipe-like narrow portion 12 and extending from the axially outer end of the first middle narrow groove 10A. Thereby, water in the axially outer wide portion 15 flows into the shoulder main groove 3 and is effectively discharged outside the ground contacting patch of the tire. Accordingly, good wet performance can be obtained.

Preferably, the wide portion 14 further includes an axially inner wide portion 25 formed axially inside the sipe-like narrow portion 12 and extending from the axially inner end of the first middle narrow grooves 10A. Such axially inner wide portions 25 supplement the drainage by the crown main groove 4, and helps to prevent aquaplaning phenomenon.

Each of the axially outer wide portion 15 and the axially inner wide portion 25 extends at an angle different from that of the sipe-like narrow portion 12, in this example, extends substantially parallel with the tire axial direction. Thereby, water in the wide portion is effectively led toward the main groove.

In each of the first middle narrow grooves 10A, the axially outer wide portion 15 and the axially inner wide portion 25 are disposed at circumferentially different positions, and the sipe-like narrow portion 12 extends therebetween inclining with respect to the tire axial direction.

In both of the axially outer wide portion 15 and the axially inner wide portion 25 of every first middle narrow groove 10A, their gentle slope parts 20 are formed on the groove-wall on one side in the tire circumferential direction. Thereby, the middle land zone 7 wears uniformly between its axially inside part and outside part, and the wear resistance is improved.

The circumferential pitch lengths L3 between the first middle narrow grooves 10A as shown in FIG. 3 are preferably set in a range of not less than 20 mm, more preferably not less than 25 mm, but not more than 40 mm, more preferably not more than 35 mm. Such first middle narrow grooves 10A reduce impact sound generated from the inboard middle land zone 7A during running, and help to improve the noise performance, while maintaining the steering stability on dry roads.

The above-mentioned second middle narrow grooves 10B and third middle narrow grooves 10C are disposed in the outboard middle land zone 7B and arranged alternately in the tire circumferential direction.

Each of the second middle narrow grooves 10B has an axially outer end connected to the outboard shoulder main groove 3B and an axially inner end connected to the crown main groove 4. Each of the third middle narrow grooves 10C has an axially outer end connected to the outboard shoulder main groove 3B and an axially inner end terminating within the outboard middle land zone 7B.

Each of the second middle narrow grooves 10B and the third middle narrow grooves 10C comprises a sipe-like narrow portion 12 and a wide portion 14 having cross-sectional shapes similar to the above described cross-sectional shapes of the first middle narrow groove 10A.

The sipe-like narrow portion 12 of each second middle narrow groove 10B extends obliquely with respect to the tire axial direction.

In this embodiment, the sipe-like narrow portions 12 of the second middle narrow grooves 10B are inclined to one direction opposite to the sipe-like narrow portions 12 of the first middle narrow grooves 10A.

Preferably, the angle θ3 of the sipe-like narrow portion 12 of the second middle narrow groove 10B with respect to the tire axial direction is less than the angle θ1 of the sipe-like narrow portion 12 of the first middle narrow groove 10A with respect to the tire axial direction. Thereby, the rigidity in the tire axial direction of the outboard middle land zone 7B becomes more than that of the inboard middle land zone 7A, and the steering stability especially at a sudden turn can be improved.

Figure 6:
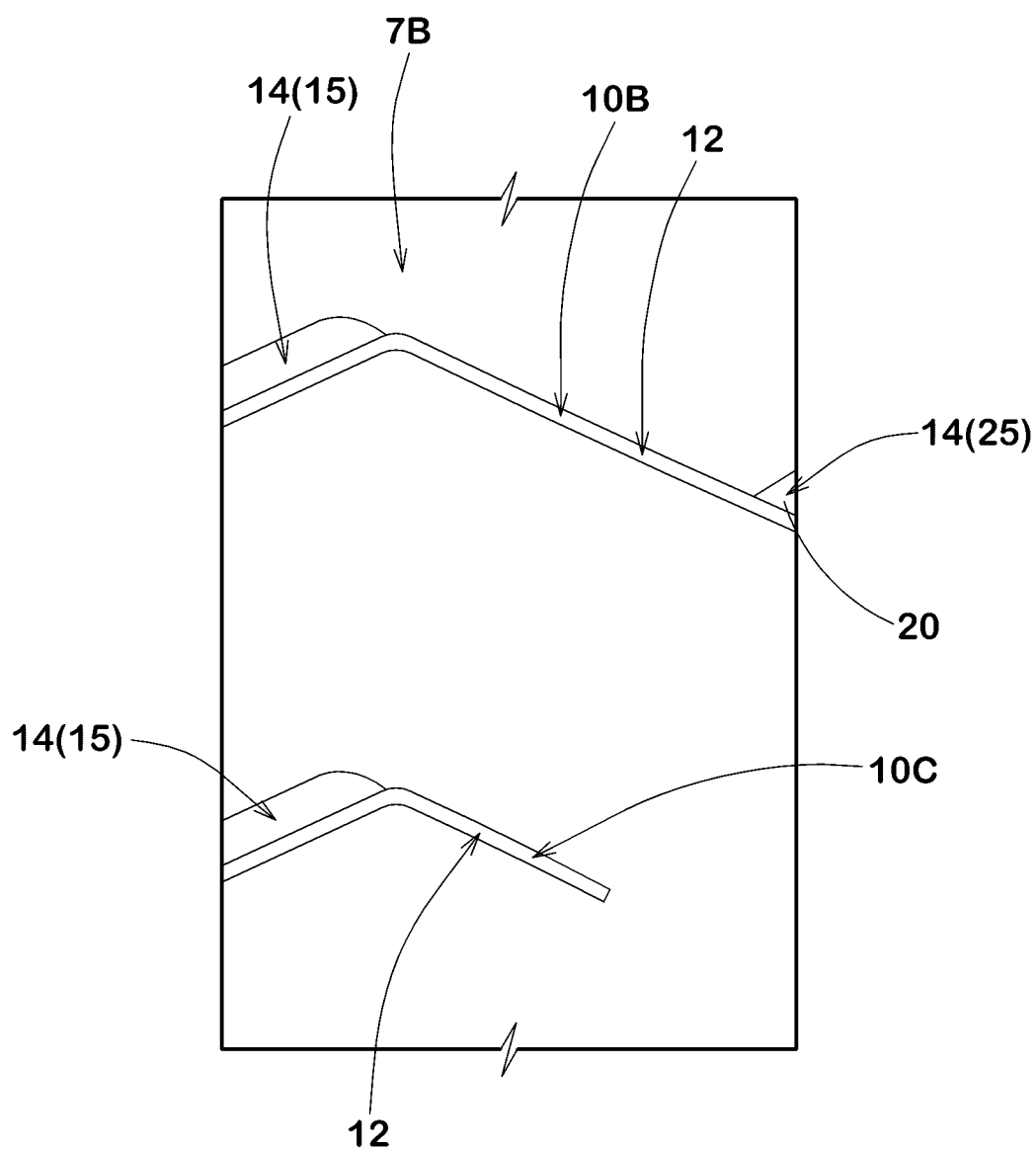
FIG. 6 shows enlarged top views of the second and third middle narrow grooves shown in FIG. 3.

As shown in FIG. 6, the wide portion 14 of the second middle narrow groove 10B includes an axially outer wide portion 15 at the axially outer end of the second middle narrow groove 10B, and
an axially inner wide portion 25 at the axially inner end of the second middle narrow groove 10B.

In this example, the axially outer wide portion 15 and the axially inner wide portion 25 have different shapes.

In this example, the axially outer wide portion 15 of the second middle narrow groove 10B is inclined with respect to the tire axial direction to the opposite direction to the inclining direction of the sipe-like narrow portion 12 of the second middle narrow grooves 10B with respect to the tire axial direction. Thereby, when the opposite groove-walls of the second middle narrow groove 10B contact with each other, the groove-walls engage with each other, and thereby, the outboard middle land zone 7B is prevented from being deformed in the tire axial direction. Accordingly, the steering stability on dry roads is improved.

In this example, the axially inner wide portion 25 of the second middle narrow grooves 10B comprises a gentle slope part 20 of a triangular shape formed by cutting off a part of a corner formed between a side face of the middle land zone 7 and a groove-wall of the second middle narrow groove 10B.

In this example, the axially inner wide portion 25 of the second middle narrow grooves 10B has a dimension in the tire axial direction which is smaller than that of the axially outer wide portion 15 of the second middle narrow grooves 10B. Such axially inner wide portion 25 of the second middle narrow grooves 10B helps to reduce uneven wear in an axially inside part of the outboard middle land zone 7B.

The above-mentioned third middle narrow groove 10C comprises an axially outer wide portion 15 at the axially outer end of the third middle narrow grooves 10C, and an axially inner sipe-like narrow portion 12.

In this example, the sipe-like narrow portion 12 of the third middle narrow groove 10C is inclined with respect to the tire axial direction to the same direction as the inclining direction of the sipe-like narrow portion 12 of the second middle narrow groove 10B.

Preferably, the sipe-like narrow portion 12 of the third middle narrow groove 10C extends substantially parallel with the sipe-like narrow portion 12 of the second middle narrow groove 10B. The sipe-like narrow portion 12 of the third middle narrow groove 10C terminates within the outboard middle land zone 7B. Thereby, the rigidity of the outboard middle land zone 7B is maintained, and the steering stability on dry roads is improved.

In this example, the axially outer wide portion 15 of the third middle narrow groove 10C is inclined with respect to the tire axial direction to the opposite direction to the inclining direction of the sipe-like narrow portion 12 with respect to the tire axial direction.

Preferably, the axially outer wide portion 15 of the third middle narrow groove 10C extends substantially parallel with the axially outer wide portion 15 of the second middle narrow groove 10B. Thereby, the rigidity in an axially outside part of the outboard middle land zone 7B becomes even, and uneven wear of the outboard middle land zone 7B is prevented.

Figure 7:
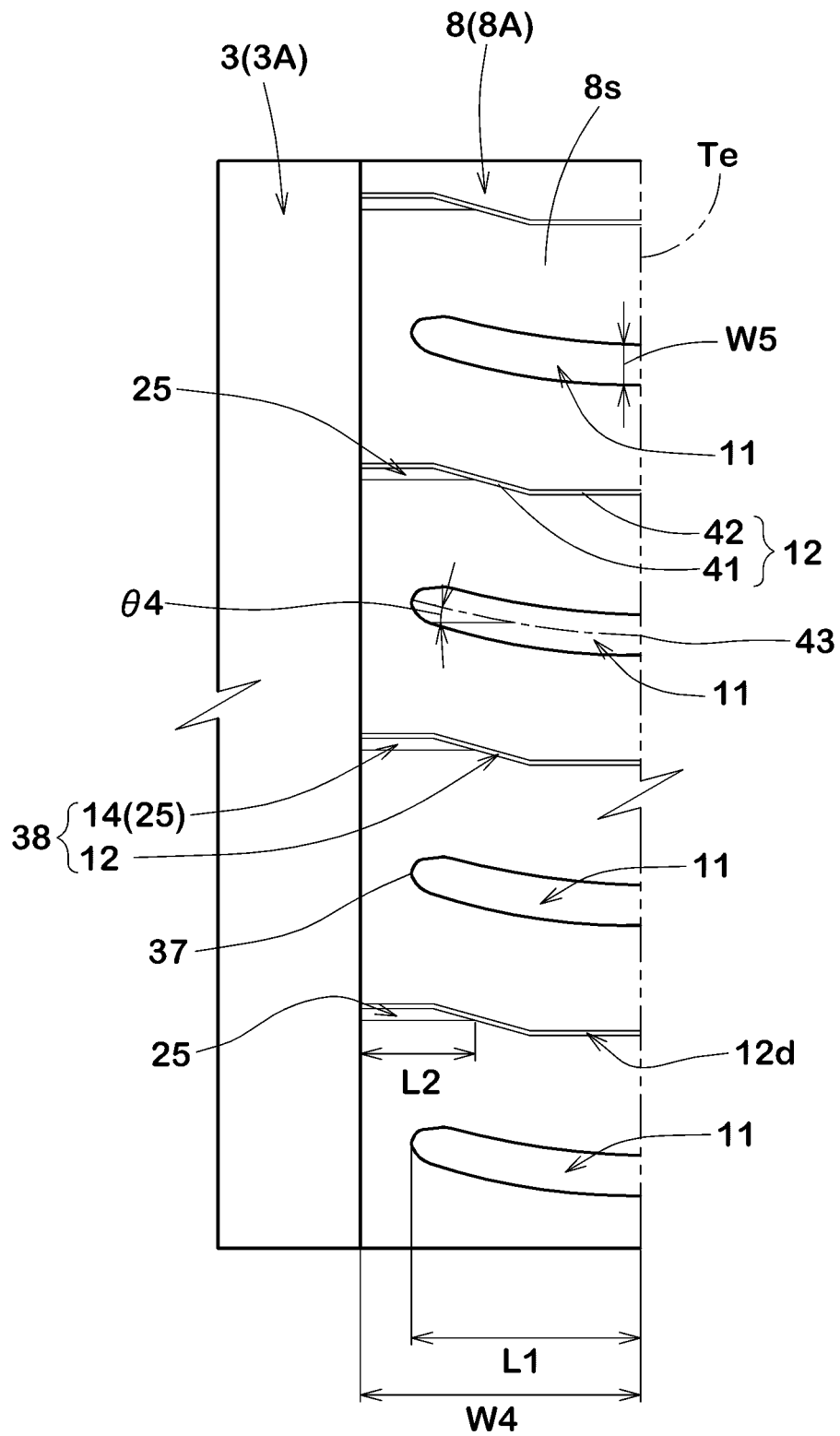
FIG. 7 is a developed partial view of the tread portion showing its inboard shoulder land zone.

As shown in FIG. 7, the shoulder land zone 8 is provided with shoulder lateral grooves 11 extending axially inwardly from the tread edges Te and terminating within the shoulder land zone 8. Thereby, the rigidity in an axially inside part of the shoulder land zone 8 is increased, and good steering stability on dry roads can be obtained. In addition, such shoulder lateral grooves 11 help to reduce the pumping sound because air does not flow thereinto from the shoulder main groove 3.

In this example, the shoulder lateral groove 11 has a width w5 of from 5.0 to 8.0 mm.

In this example, the axial length L1 of the shoulder lateral groove 11 is 0.65 to 0.90 times the axial width w4 of the shoulder land zone 8.

Such shoulder lateral grooves 11 can improve the wet performance and steering stability on dry roads well balancedly.

In this example, it is preferable that the angle θ4 of the shoulder lateral grooves 11 with respect to the tire axial direction is gradually increased toward the axial inside. Such shoulder lateral grooves 11 can effectively lead the water in the grooves toward the tread edge Te.

It is preferable that, as shown in FIG. 1, the axially outer ends 43 (at the tread edge Te) of the shoulder lateral grooves 11 disposed in the inboard shoulder land zone 8A are respectively shifted in the tire circumferential direction from the axially outer ends 44 (at the tread edge Te) of the shoulder lateral grooves 11 disposed in the outboard shoulder land zone 8B. Thereby, pumping sound from the shoulder lateral grooves 11 becomes white noise, and the noise performance is improved.

In this example, it is preferable that, as shown in FIG. 7, each shoulder land zone 8 is provided with shoulder narrow grooves 38 connected to the shoulder main groove 3.

In this example, the shoulder narrow groove 38 comprises a sipe-like narrow portion 12 whose groove width is less than 2 mm at the ground contacting surface 8s of the shoulder land zone 8, and a wide portion 14 whose groove width is not less than 2 mm at the ground contacting surface 8s of the shoulder land zone 8.

In this embodiment, the sipe-like narrow portion 12 and the wide portion 14 of the shoulder narrow groove 38 have cross-sectional shapes similar to the above described cross-sectional shapes of the sipe-like narrow portion 12 and the wide portion 14 of the first middle narrow grooves 10A as shown in FIGS. 5(a) and 5(b).

In this example, the wide portion 14 of the shoulder narrow groove 38 includes an axially inner wide portion 25 at the axially inner end of the shoulder narrow groove 38. In this embodiment, the axially inner wide portion 25 extends substantially parallel with the tire axial direction.

In this example, it is preferable that the axially inner wide portions 25 of the shoulder narrow grooves 38 extend to a position axially outside the axially inner ends 37 of the shoulder lateral grooves 11. Thereby, a water film between the shoulder land zone 8 and the road surface is led to the shoulder lateral grooves 11 and/or the axially inner wide portions 25, and aquaplaning phenomenon can be effectively prevented.

The axial length L2 of the axially inner wide portion 25 of the shoulder narrow groove 38 is preferably not less than 0.35 times, more preferably not less than 0.40 times, but preferably not more than 0.50 times, more preferably not more than 0.45 times the axial width w4 of the shoulder land zone 8. Such axially inner wide portion 25 helps to improve the wet performance, while suppressing uneven wear in an axially inside part of the shoulder land zone 8.

It is preferable that the axially inner wide portions 25 of the shoulder narrow grooves 38 respectively overlap in the tire circumferential direction with the circumferential extents 40 (shown in FIG. 1) of the axially outer wide portions 15 of the middle narrow grooves 10. Thereby, the middle land zone 7 and the shoulder land zone 8 are similarly deformed during running, and the steering stability is improved.

In this example, as shown in FIG. 7, the sipe-like narrow portion 12 of the shoulder narrow groove 38 is connected to the axially outer end of the axially inner wide portion 25 of the shoulder narrow groove 38.

In this example, the sipe-like narrow portions 12 of the shoulder narrow grooves 38 disposed in the inboard shoulder land zone 8A extend to the tread edge Te from the respective axially inner wide portions 25. Such sipe-like narrow portion 12 improve the wet performance and the wandering performance.

In this example, the sipe-like narrow portion 12 of the shoulder narrow groove 38 comprises a first part 41 on the axially inner wide portion 25 side inclined with respect to the tire axial direction, and a second part 42 on the tread edge Te side extending substantially parallel with the tire axial direction. The edges of such sipe-like narrow portion 12 generate a frictional force in the tire axial direction.

Figure 8:
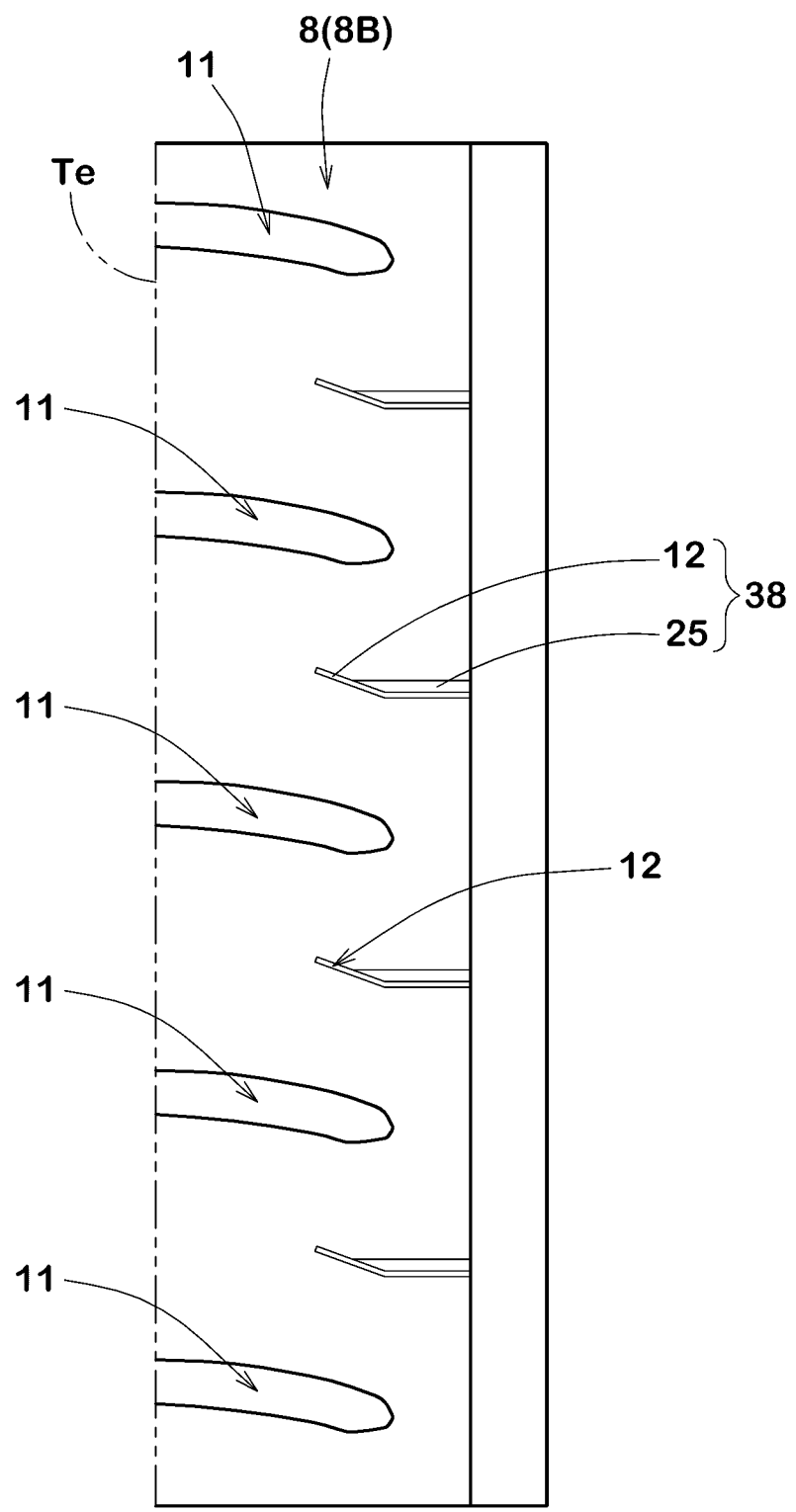
FIG. 8 is a developed partial view of the tread portion showing its outboard shoulder land zone.

As shown in FIG. 8, the outboard shoulder land zone 8B is provided with shoulder lateral grooves 11 and shoulder narrow grooves 38 similarly to the inboard shoulder land zone 8A.

In this example, the shoulder narrow groove 38 disposed in the outboard shoulder land zone 8B comprises an axially inner wide portion 25, and an axially outer sipe-like narrow portion 12 extending axially outwardly from the axially inner wide portion 25 and terminating within the outboard shoulder land zone 8B. Thereby, the rigidity of the outboard shoulder land zone 8B is maintained, and the steering stability on dry roads is improved.

Figure 9:
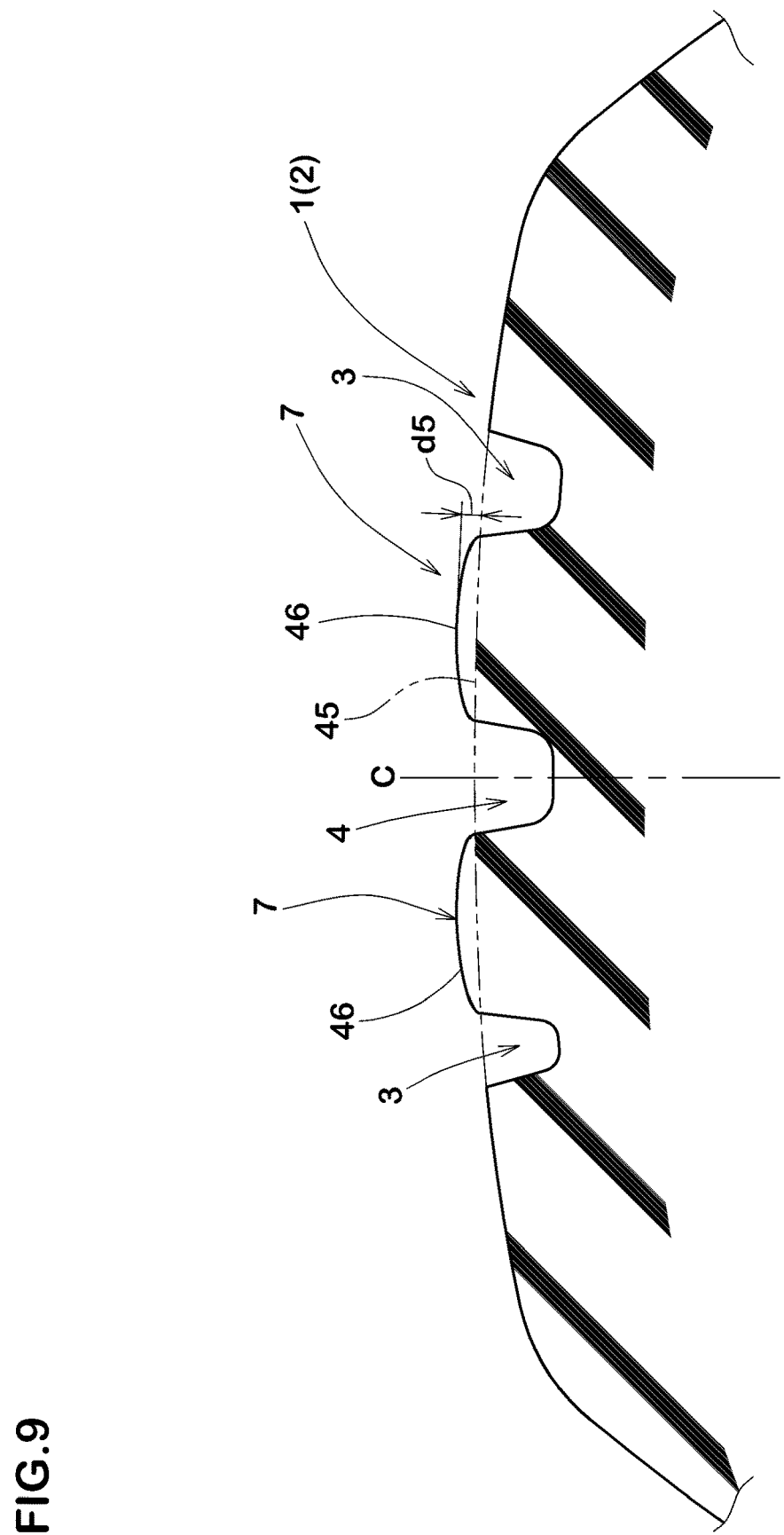
FIG. 9 is a cross sectional view of a tread portion of a pneumatic tire as another embodiment of the present invention.

FIG. 9 schematically shows a meridian sectional view of a tire 1 as another embodiment of the present invention, wherein each middle land zone 7 has a protrusion 46 protruding radially outwardly from an imaginary tread profile line 45 extending smoothly in parallel with the inner surface of the tire. Such protrusion 46 pushes aside the water existing on the road surface toward the shoulder main groove 3 and/or the crown main groove 4, therefore, the wet performance is effectively improved. In order to improve the steering stability on dry roads and the wet performance well balancedly, a protruding height d5 of the radially outermost point of the protrusion 46 measured in the tire radial direction from the imaginary tread profile line 45 is preferably not less than 0.1 mm, more preferably not less than 0.15 mm, but preferably not more than 2.0 mm, more preferably not more than 1.9 mm.

WORKING EXAMPLES

Based on the tread pattern shown in FIG. 1, pneumatic tires of size 195/65R15 (rim size: 15×6J, tire pressure: 230 kPa) having specifications listed in Table 1 were experimentally manufactured and tested for the steering stability on dry roads, wet performance and noise performance.

Figure 10:
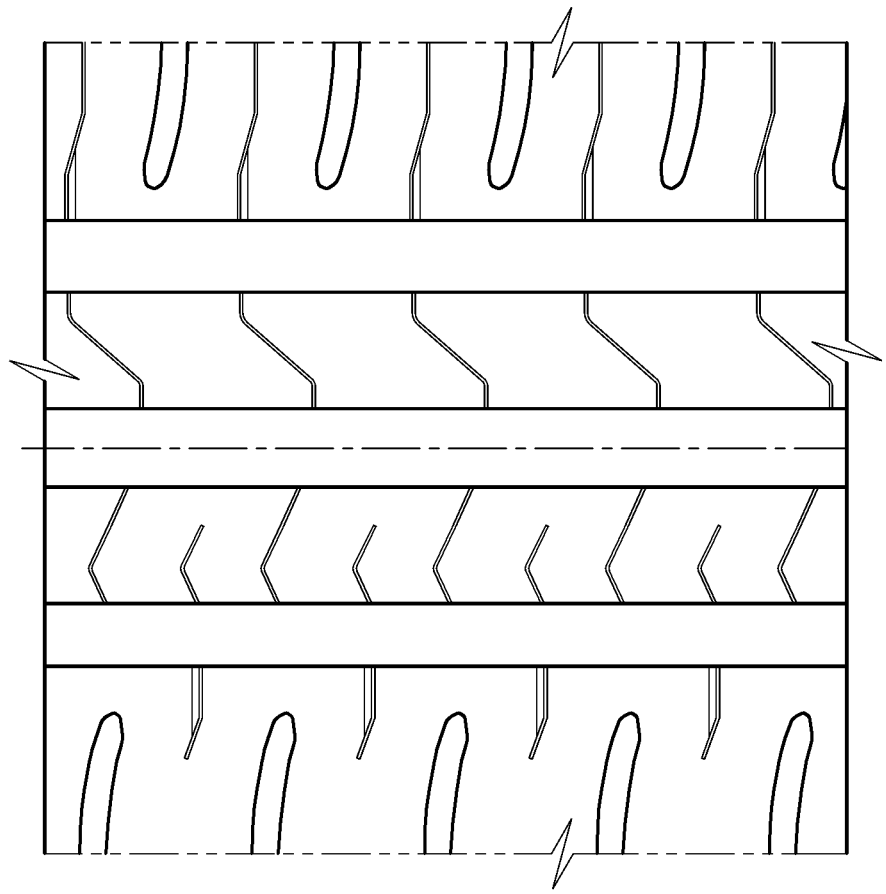
FIG. 10 is a developed partial view of a tread portion of a pneumatic tire as comparative example 1.

In the pneumatic tire as comparative example 1, each middle narrow groove 10 was formed by the sipe-like narrow portion only, namely, the wide portion was omitted as shown in FIG. 10.

Figure 11:
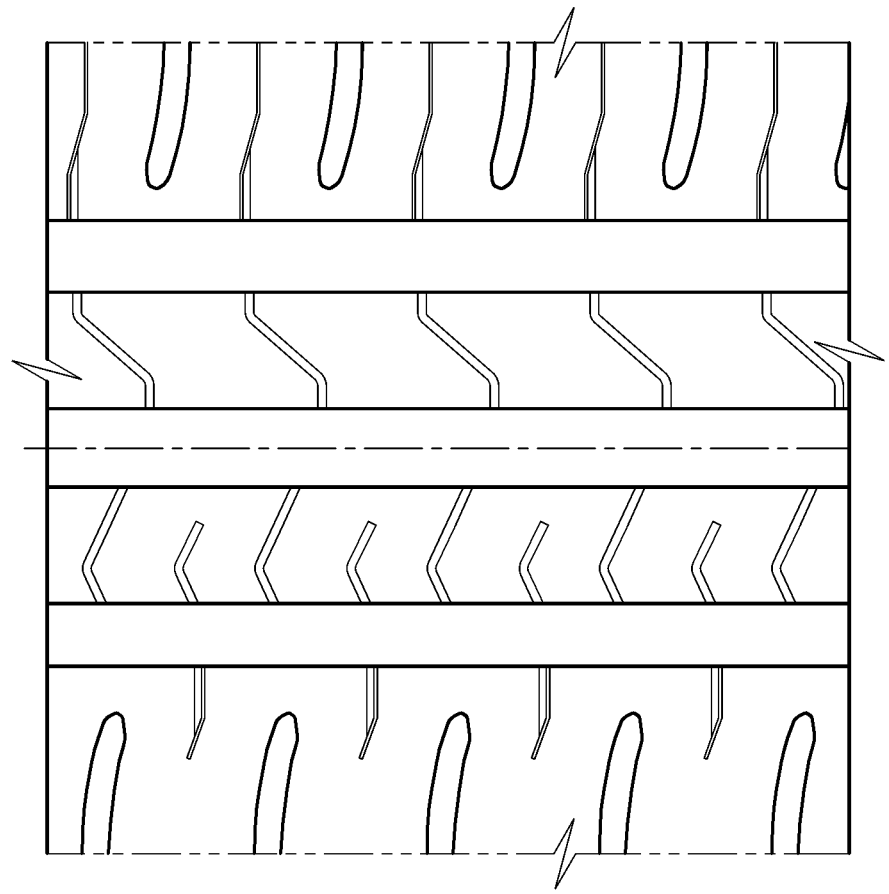
FIG. 11 is a developed partial view of a tread portion of a pneumatic tire as comparative example 2.

In the pneumatic tire as comparative example 2, each middle narrow groove 10 was entirely provided with a groove width of more than 2 mm and the wide portion was omitted as shown in FIG. 11.

<Steering Stability on Dry Roads>

The test tires were mounted on all wheels of a 2400 cc front-wheel-drive passenger car, and a test driver evaluated the steering stability during running on an asphalt-paved circuit course.

The results are indicated in Table 1 by an index based on comparative example 1 being 100, wherein the larger the index number, the better the steering stability.

<Wet Performance>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in table 1 by an index based on comparative example 1 being 100, wherein the larger the index number, the better the wet performance.

<Noise Performance>

The test car was run on a dry asphalt road at 60 km/h, and the noise sound was measured near the driver's head.

The results are indicated in table 1 by an index based on working example 1 being 100, wherein the larger the index number, the better the noise performance.

TABLE 1

| tire | comparative example 1 | comparative example 2 | working example 1 | working example 2 | working example 3 | working example 4 | working example 5 | working example 6 |
|---|---|---|---|---|---|---|---|---|
| tread pattern (FIG. no.) | 10 | 11 | 1 | 1 | 1 | 1 | 1 | 1 |
| groove width ratio W7/W6 | 0.85 | 0.85 | 0.85 | 0.70 | 1.00 | 0.85 | 0.85 | 0.85 |
| pitch length L3 (mm) | 30 | 30 | 30 | 30 | 30 | 20 | 40 | 30 |
| depth ratio d3/d4 | — | — | 0.25 | 0.25 | 0.25 | 0.25 | 0.25 | 0.15 |
| angle $\theta 1$ (deg.) | 50 | — | 50 | 50 | 50 | 50 | 50 | 50 |
| angle $\theta 3$ (deg.) | 20 | — | 20 | 20 | 20 | 20 | 20 | 20 |
| protruding height d5 (mm) | 0 | 0 | 0 | 0 | 0 | 0 | 0 | 0 |
| steering stability on dry roads | 100 | 95 | 100 | 102 | 99 | 99 | 101 | 101 |
| wet performance | 100 | 107 | 106 | 104 | 107 | 107 | 105 | 105 |
| noise performance | 100 | 97 | 100 | 101 | 99 | 101 | 99 | 100 |

| tire | working example 7 | working example 8 | working example 9 | working example 10 | working example 11 | working example 12 | working example 13 | working example 14 |
|---|---|---|---|---|---|---|---|---|
| tread pattern(FIG. no.) | 1 | 1 | 1 | 1 | 1 | 1 | 1 | 1 |
| groove width ratio W7/W6 | 0.85 | 0.85 | 0.85 | 0.85 | 0.85 | 0.85 | 0.85 | 0.85 |
| pitch length L3 (mm) | 30 | 30 | 30 | 30 | 30 | 30 | 30 | 30 |
| depth ratio d3/d4 | 0.2 | 0.35 | 0.25 | 0.25 | 0.25 | 0.25 | 0.25 | 0.25 |
| angle $\theta 1$ (deg.) | 50 | 50 | 40 | 40 | 20 | 50 | 50 | 50 |
| angle $\theta 3$ (deg.) | 20 | 20 | 20 | 40 | 40 | 20 | 20 | 20 |
| protruding height d5 (mm) | 0 | 0 | 0 | 0 | 0 | 0.10 | 0.20 | 2.0 |
| steering stability on dry roads | 100 | 98 | 100 | 99 | 98 | 100 | 100 | 98 |
| wet performance | 106 | 107 | 106 | 106 | 107 | 107 | 108 | 110 |
| noise performance | 100 | 100 | 100 | 100 | 100 | 100 | 100 | 99 |

From the test results, it was confirmed that the pneumatic tire according to the present invention can be improved in the steering stability on dry roads and the wet performance well balancedly, without sacrificing the noise performance.

REFERENCE SIGNS LIST 2 tread portion
3 shoulder main groove
4 crown main groove
8 shoulder land zone
7 middle land zone
11 shoulder lateral grooves
10 middle narrow grooves
12 sipe-like narrow portion
14 wide portion
15 axially outer wide portion

The invention claimed is:

1. A pneumatic tire comprising
a tread portion provided with circumferentially continuously extending main grooves including a pair of axially outermost shoulder main grooves and a crown main groove therebetween so that the tread portion is axially divided into land zones including a pair of shoulder land zones axially outside the respective shoulder main grooves and a pair of middle land zones therebetween,
wherein
each said shoulder land zone is provided with shoulder lateral grooves extending axially inwardly from the tread edge and terminating within the shoulder land zone, and
each said middle land zone is provided with middle narrow grooves each having an axially outer end connected to the shoulder main groove, and each comprising a sipe-like narrow portion and an axially outer wide portion which is wider than sipe-like narrow portion and formed at the axially outer end of the middle narrow groove,
wherein
all of the middle narrow grooves of one of the middle land zones are first middle narrow grooves each made up of the axially outer wide portion, an axially inner wide portion wider than sipe-like narrow portion, and the sipe-like narrow portion therebetween, and
all of the middle narrow grooves of the other middle land zone are second middle narrow grooves each made up of the axially outer wide portion, an axially inner wide portion wider than sipe-like narrow portion, and the sipe-like narrow portion therebetween, and third middle narrow grooves each made up of the axially outer wide portion and the sipe-like narrow portion disposed axially inward thereof and terminating within the other middle land zone, wherein at the ground contacting surface of the middle land zone, the sipe-like narrow portions each have a width of less than 2 mm, and the wide portions each have a width of not less than 2 mm.

2. The pneumatic tire according to claim 1, wherein said sipe-like narrow portion of each the middle narrow grooves extends radially inwardly to the groove bottom of the middle narrow groove with a constant groove width, and said wide portion of each of the middle narrow grooves comprises a tapered part in which the groove width is gradually decreased toward the radially inside of the tire, and a radially inner part continued from the tapered part and extending radially inwardly with the same groove width as the sipe-like narrow portion of the middle narrow grooves.

3. The pneumatic tire according to claim 1, wherein each said sipe-like narrow portion extends obliquely with respect to the tire axial direction.

4. The pneumatic tire according to claim 3, wherein each said wide portion is inclined with respect to the tire axial direction at a different angle than the sipe-like narrow portion connected to the wide portion.

5. The pneumatic tire according to claim 1, wherein in each of the first middle narrow grooves, said wide portions extend substantially parallel with the tire axial direction.

6. The pneumatic tire according to claim 5, wherein in each of the second and third middle narrow grooves, said wide portion is inclined with respect to the tire axial direction.

7. The pneumatic tire according to claim 1, wherein in each of the second and third middle narrow grooves, said axially outer wide portion is inclined with respect to the tire axial direction to the opposite direction to the inclining direction of the sipe-like narrow portion with respect to the tire axial direction.

8. The pneumatic tire according to claim 5, wherein in each of the first middle narrow grooves, said sipe-like narrow portion extends between the axially outer wide portion and the axially inner wide portion obliquely with respect to the tire axial direction, and the axially outer wide portions are shifted in the tire circumferential direction from the axially inner wide portions.

9. The pneumatic tire accordingly to claim 1, wherein each said middle narrow groove has a first groove-wall on one side in the tire circumferential direction and a second groove-wall on the other side in the tire circumferential direction, and the axially outer and inner wide portions of each of the first middle narrow grooves are each provided in the first groove-wall with a gentle slope part inclined with respect to the tire radial direction largely more than the second groove-wall so as to have a tapered part in which the groove width is gradually decreased toward the radially inside of the tire.

10. The pneumatic tire according to claim 1, wherein the second middle narrow grooves and the third middle narrow grooves are alternately arranged in the tire circumferential direction.

11. The pneumatic tire according to claim 1, wherein the angle with respect to the tire axial direction of the sipe-like narrow portions of the second middle narrow grooves is smaller than the angle with respect to the tire axial direction of the sipe-like narrow portions of the first middle narrow grooves.

12. The pneumatic tire according to claim 1, wherein in each of the second middle narrow grooves, the sipe-like narrow portion is inclined with respect to the tire axial direction to one side in the tire circumferential direction, and the axially outer wide portion is inclined with respect to the tire axial direction to the other side in the tire circumferential direction.

13. The pneumatic tire according to claim 1, wherein in each of the second middle narrow grooves, the axial length of the axially inner wide portion is smaller than the axial length of the axially outer wide portion.

14. The pneumatic tire according to claim 1, wherein in each of the third middle narrow grooves, the sipe-like narrow portion is inclined with respect to the tire axial direction to one side in the tire circumferential direction, the axially outer wide portion is inclined with respect to the tire axial direction to the other side in the tire circumferential direction, and the axially outer wide portions of the third middle narrow grooves extend parallel with the axially outer wide portions of the second middle narrow grooves.

* * * * *